United States Patent
Dixon et al.

(10) Patent No.: US 12,221,178 B2
(45) Date of Patent: Feb. 11, 2025

(54) ARTICULATED TRUCK STEERING

(71) Applicant: Caterpillar SARL, Geneva (CH)

(72) Inventors: Matthew Lee Dixon, Peterborough (GB); Steven Edward Johnson, Metamora, IL (US); Adam J. Adeeb, Naperville, IL (US)

(73) Assignee: Caterpillar SARL, Geneva (CH)

( * ) Notice: Subject to any disclaimer, the term of this patent is extended or adjusted under 35 U.S.C. 154(b) by 290 days.

(21) Appl. No.: 17/922,744

(22) PCT Filed: Apr. 16, 2021

(86) PCT No.: PCT/EP2021/025142
§ 371 (c)(1),
(2) Date: Nov. 1, 2022

(87) PCT Pub. No.: WO2021/219246
PCT Pub. Date: Nov. 4, 2021

(65) Prior Publication Data
US 2023/0166790 A1    Jun. 1, 2023

(30) Foreign Application Priority Data
May 1, 2020 (GB) .................... 2006490

(51) Int. Cl.
*B62D 5/12* (2006.01)
*B62D 5/06* (2006.01)
(Continued)

(52) U.S. Cl.
CPC ............. *B62D 5/12* (2013.01); *B62D 5/061* (2013.01); *B62D 5/09* (2013.01); *B62D 12/00* (2013.01); *F15B 15/1447* (2013.01)

(58) Field of Classification Search
CPC .......... B62D 12/02; B62D 5/12; F15B 15/222
See application file for complete search history.

(56) References Cited

U.S. PATENT DOCUMENTS 3,677,141 A    7/1972 Lagerqvist et al.
3,974,910 A    8/1976 Papai
(Continued)

FOREIGN PATENT DOCUMENTS

CN    101907110 B    8/2012
EP    3156307 A1    4/2017
(Continued)

OTHER PUBLICATIONS

International Search Report related to Application No. PCT/EP2021/025142; reported on Jul. 7, 2021.
(Continued)

*Primary Examiner* — Kevin Hurley
*Assistant Examiner* — Hosam Shabara

(57) ABSTRACT

A steering system for an articulated truck. The articulated truck is formed of a tractor and a trailer and an articulation joint. The steering system includes a hydraulic cylinder, with a cylinder barrel and a piston. The steering system provides for changes in angle between the tractor and the trailer. The hydraulic cylinder includes a snubbing tube projecting into the cylinder barrel. A hydraulic fluid passage opens into the cylinder barrel within the snubbing tube. The snubbing tube includes a main slot and a plurality of channels each extending between an interior and an exterior of the snubbing tube. The plurality of channels have a cross sectional area smaller than a cross sectional area of the main slot. When the articulated truck is steered, the piston moves in the cylinder barrel and the snubbing tube dampens the movement to prevent forces generated by the piston damaging the articulated truck.

11 Claims, 9 Drawing Sheets

(51) Int. Cl.
 *B62D 5/09* (2006.01)
 *B62D 12/00* (2006.01)
 *F15B 15/14* (2006.01)

(56) References Cited

U.S. PATENT DOCUMENTS

| | | |
|---|---|---|
| 5,413,030 A | 5/1995 | Richardson et al. |
| 5,507,218 A * | 4/1996 | Lipinski .............. F15B 15/1438 92/143 |
| 5,517,898 A | 5/1996 | Kim et al. |
| H1846 H | 4/2000 | Poorman |
| 6,382,075 B1 * | 5/2002 | Chiaramonte ......... B62D 5/061 91/399 |
| 7,171,888 B2 | 2/2007 | Boecker |
| 2009/0084257 A1 | 4/2009 | Buckley et al. |
| 2011/0101646 A1 | 5/2011 | Sakita |
| 2017/0100982 A1 * | 4/2017 | Curnyn .................. B62D 12/00 |
| 2022/0097764 A1 * | 3/2022 | Hickey ............... B60W 30/045 |

FOREIGN PATENT DOCUMENTS

| | | |
|---|---|---|
| GB | 2364353 A | 1/2002 |
| WO | 0242649 A1 | 5/2002 |
| WO | 2016079653 A1 | 5/2016 |

OTHER PUBLICATIONS

Great Britain Search Report related to Application No. 2006490.3; reported on Oct. 21, 2020,.

* cited by examiner

ARTICULATED TRUCK STEERING

CROSS-REFERENCE TO RELATED APPLICATION

This Application is a 35 USC § 371 US National Stage filing of International Application No. PCT/EP2021/025142 filed on Apr. 16, 2021 which claims priority under the Paris Convention to Great Britain Patent Application No. 2006490.3 filed on May 1, 2020.

BACKGROUND

This application relates to articulated trucks with hydraulic steering.

An articulated truck may have a front portion and a rear portion with a pivot joint between the front portion and the rear portion. The front portion may include a cab and the rear portion may include a dump body. Steering between the front portion and the rear portion may be achieved by pivoting the front portion in relation to the rear portion using hydraulic cylinders. Each hydraulic cylinder may comprise a piston movable within a cylinder barrel in response to changes in pressure of hydraulic fluid. Hydraulic fluid may be passed into and out of the cylinder barrel via one or more access ports that are small in cross sectional area relative to a cross sectional area of a face of the piston.

SUMMARY

In a first aspect of the disclosure, there is provided a steering apparatus for an articulated truck having a front portion, a rear portion, and an articulation joint between the front portion and the rear portion. The steering apparatus includes a hydraulic cylinder, where the hydraulic cylinder includes a cylinder barrel and a piston. The piston moves in the cylinder barrel to steer the articulated truck by providing for changes in angle between the front portion and the rear portion of the articulated truck. The cylinder barrel comprises a closed end and a primary hydraulic fluid passage for routing hydraulic fluid into and out of the cylinder barrel. A snubbing tube projects from the closed end into the cylinder barrel, and the primary hydraulic fluid passage opens into the cylinder barrel within the snubbing tube. The piston comprises a piston face that faces the closed end of the cylinder barrel. A snubbing aperture is formed in the piston face and is aligned with and receives the snubbing tube. The snubbing tube comprises a slot located at a distal end of the snubbing tube distant from the closed end of the cylinder barrel that extends between an exterior of the snubbing tube and an interior of the snubbing tube. A plurality of channels are located between the slot and the closed end of the cylinder barrel and extend between the exterior of the snubbing tube and the interior of the snubbing tube. Each of the plurality of channels have a cross sectional area smaller than a cross sectional area of the slot.

In embodiments of the present disclosure, the snubbing tube provides that the steering apparatus when approaching full steering lock is smooth and avoids damage to components associated with rapid forces and rapid changes in pressure.

In some embodiments, the steering apparatus may comprise a secondary hydraulic fluid passage in the closed end of the cylinder barrel for routing hydraulic fluid into and out of the cylinder barrel, wherein the secondary hydraulic fluid passage opens into the cylinder barrel outside the snubbing tube. In such embodiments, fast/smooth/efficient movement of the steering system out of full lock is achieved.

In some embodiments, the secondary hydraulic fluid passage may comprise a valve having a closed position in which the secondary hydraulic fluid passage is closed and an open position in which the secondary hydraulic fluid passage is open. The valve providing for faster/improved movement out of full lock.

In some embodiments, the valve may be a check valve that responds to a threshold pressure, wherein in an event that a pressure experienced by the check valve exceeds the threshold pressure the valve adopts the open position and in an event that the pressure experienced by the check valve is less than the threshold pressure the valve adopts the closed position. In such embodiments, the improved steering may be provided without an active valve control system. In some embodiments, the threshold pressure may be between X and Y bar.

In some embodiments, the cylinder barrel may comprise an annular abutment against which the piston face comes to rest at a full lock position of the steering apparatus. The cylinder barrel may comprise an annular cavity coaxial with the annular abutment, wherein the piston face stops short of the annular abutment at the full lock position of the steering apparatus. In this way, a volume of hydraulic fluid is available even when the piston is at its inmost position.

In some embodiments, the secondary hydraulic fluid passage may open into the cylinder barrel within the annular cavity.

Alignment of the snubbing aperture with the snubbing tube may be such that the snubbing tube is received within the snubbing aperture so as to provide a fluid tight seal between an exterior of the snubbing tube and an interior of the snubbing aperture.

In a second aspect of the disclosure there is provided an articulated truck comprising a front portion, a rear portion, and an articulation joint between the front portion and the rear portion, and further comprising the steering apparatus, according to embodiments of the present disclosure, configured to effect a change in angle between the front portion and the rear portion. In such embodiments, the articulated truck has improved operational behaviour when approaching full steering lock. The improved operation behaviour provides for smoother steering for the machine operator and avoids damage to components associated with rapid forces and rapid changes in pressure.

In some embodiments, the steering apparatus may be one of a pair of cooperating steering apparatuses, wherein one of the pair of steering apparatuses is on a left side of the machine to effect extension and contraction between the front portion and the rear portion on the left side of the machine and another of the pair of steering apparatuses is on a right side of the machine to effect extension and contraction between the front portion and the rear portion on the right side of the machine.

BRIEF DESCRIPTION OF THE DRAWINGS

Embodiments of the disclosure are now described by way of example only with reference to the following figures in which.

DETAILED DESCRIPTION

The weight of the dump body of an articulated truck, especially when carrying a load, means that significant force may be imparted on the hydraulic cylinders by the dump body. These forces may be transferred to other components of the articulated truck and the operator. The issue of sudden forces may be particularly acute when a piston is approaching the end of its cylinder barrel and the force applied by the load in the dump body results in the piston suddenly abutting the closed end of the cylinder barrel. Without sufficient damping, forces on the articulated truck resulting from the weight of the dump body acting on the hydraulic cylinders may reduce component life. In addition, sudden changes in pressure may result in a jolt being experienced by the operator. The repeated nature of these steering jolts may result in operator fatigue and damage to the articulated truck/steering system.

Damping may be used to prevent a single sudden force being experienced by the articulated truck when the piston reaches the end of the cylinder barrel. However, in circumstances the damping may be triggered in a binary fashion. This may be the case, for example, if the damping is affected by the sudden opening or closing of a binary valve. This may result in sudden forces being applied to components of the articulated truck at the moment in which the damping mechanism comes into effect. These sudden forces having an adverse effect on component life and operator comfort In embodiments of the present disclosure, the flow of hydraulic fluid through the snubbing tube is controlled to provide for damping when the steering is turned to full lock or thereabouts. The snubbing tube is configured to prevent damping occurring in a binary fashion. Furthermore, in some embodiments, a valve may be used to provide for fast release from full lock that otherwise may be hindered by the snubbing tube.

Figure 1:
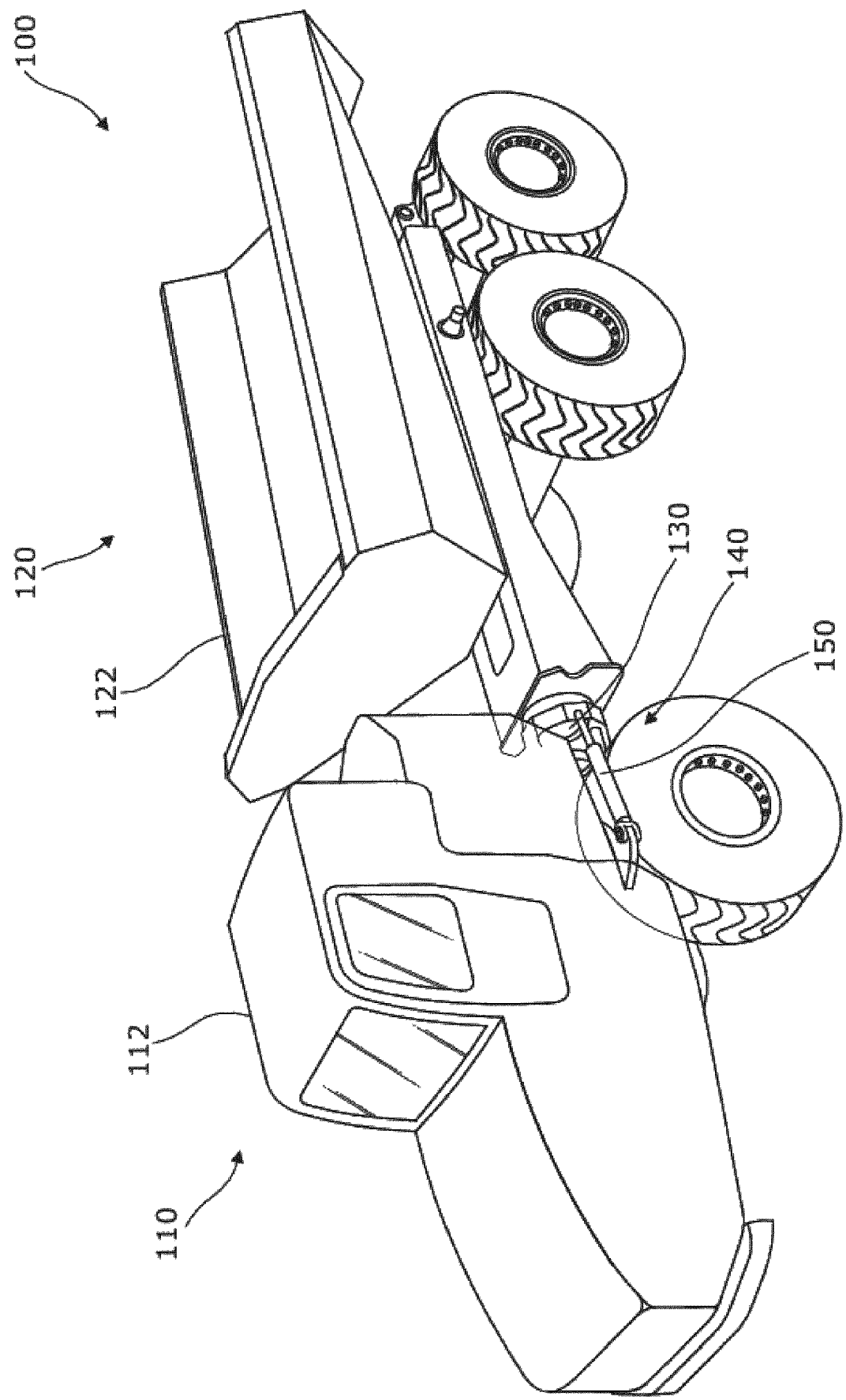
FIG. 1 shows a schematic view of an articulated truck having a steering system in accordance with the present disclosure.
Figure 2:
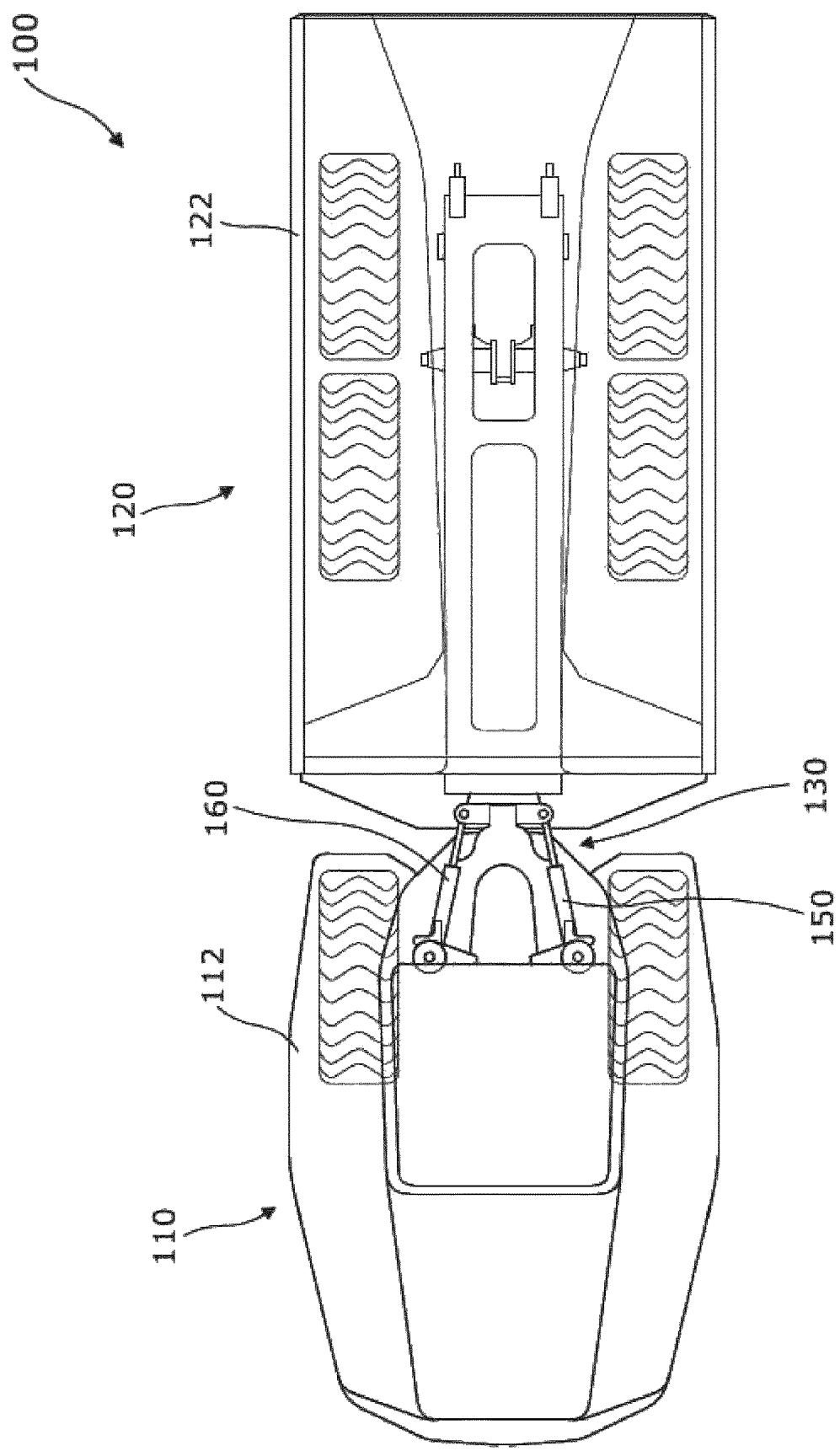
FIG. 2 shows a further a schematic view of the articulated truck of FIG. 1 from above.

FIGS. 1 and 2 show an articulated truck 100 comprising a front portion 110 a rear portion 120 and an articulation joint 130 between the front portion 110 and the rear portion 120. The front portion 110 comprises a cab 112 and the rear portion comprises a dump body 122. The articulated truck 100 further comprises a steering apparatus 140 in accordance with the present disclosure. The steering apparatus 140 is configured to steer the articulated truck 100 by effecting a change in angle between the front portion 110 and the rear portion 120. The steering apparatus 140 comprises a pair of hydraulic cylinders 150, 160 which are used to effect a change in angle between the front portion 110 and the rear portion 120. A first hydraulic cylinder 150 of the pair of hydraulic cylinders is configured to increase a distance between the front portion 110 and the rear portion 120 on a left side of the articulated truck, and a second hydraulic cylinder 160 of the pair of hydraulic cylinders is configured to increase a distance between the front portion 110 and the rear portion 120 on a right side of the truck.

Figure 3:
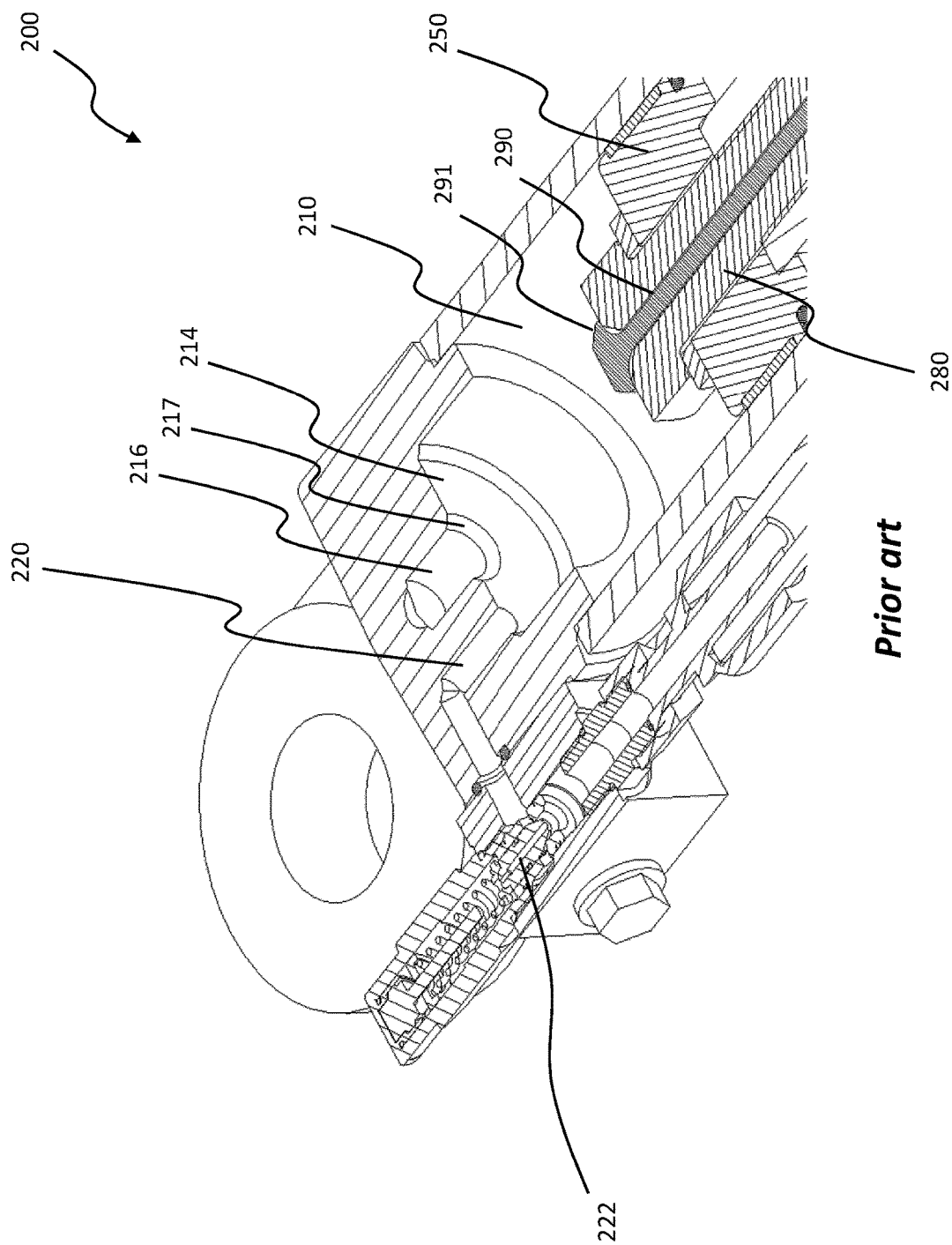
FIG. 3 shows a schematic cross-sectional view of a hydraulic cylinder employed as part of a steering system in accordance with the prior art.

FIG. 3 shows a schematic cross-sectional view of part of a hydraulic cylinder 200 in accordance with the prior art. The hydraulic cylinder 200 comprises a cylinder barrel 210 having a closed end 214 and a piston 250 movable within the cylinder barrel 210. The cylinder barrel 210 comprises a primary hydraulic fluid passage 216 and a secondary hydraulic fluid passage 220.

The primary hydraulic fluid passage 216 includes an elbow portion (not shown in FIG. 3) by which the passage continues from an axial portion (shown in FIG. 3) in an upward direction (not shown in FIG. 3 on account of the cutaway nature of FIG. 3).

The secondary hydraulic fluid passage 220 comprises a valve 222 which is configured to open in response to pressure of hydraulic fluid in the cylinder barrel 210 exceeding a hydraulic fluid threshold pressure value. A diameter of the secondary hydraulic fluid passage 220 is smaller than a diameter of the primary hydraulic fluid passage 216. In this way, the primary hydraulic fluid passage 216 has a greater capacity to receive hydraulic fluid from the cylinder barrel 210 than the secondary hydraulic fluid passage 220.

The piston 250 includes a central pin 290 that is slidable axially within a core 280 of the piston 250. The central pin 290 is spring loaded or otherwise biased to extend axially out of the core 280 towards the closed end 214 of the cylinder barrel 210 by a biasing element (not shown). (This is not as shown in FIG. 3, which shows the central pin 290 fully within the core 280 against the bias provided by the biasing element.) A front end of the central pin 290 facing the closed end 214 of the cylinder barrel 210 comprises an exterior chamfered surface 291.

In an event that the piston 250 is moving towards the closed end 214 of the cylinder barrel 210 but is not closely approaching the closed end 214 of the cylinder barrel 210, hydraulic fluid can exit the cylinder barrel 210 via the primary hydraulic fluid passage 216. In these circumstances, the pressure of the hydraulic fluid does not exceed the hydraulic fluid threshold pressure value and the valve 222 remains closed.

In an event that the piston 250 is more closely approaching the closed end 214 of the cylinder barrel 210, the central pin 290 of the piston 250, which is biased to extend out of the core 280 is received into an interior chamfered opening 217 of the primary hydraulic fluid passage 216 that corresponds to the exterior chamfered surface 291 of the central pin 290 such that the primary hydraulic fluid passage 216 is thereby closed.

As the piston 250 moves closer towards the closed end 214 of the cylinder barrel 210, the central pin 250 remains stationary with respect to the primary hydraulic fluid passage 216 but moves axially relative to the core 280 of the piston 250 against the bias of the pin 290. In this way, the piston 250 can continue to move towards the closed end 214 of the cylinder barrel 210 until such time as an outer portion of a front face of the piston 250 abuts an outer portion of the closed end 214 of the cylinder barrel 210.

Once the primary hydraulic fluid passage 216 closes, hydraulic fluid pressure in the cylinder barrel 210 increases until it exceeds the pressure threshold value such that the valve 222 opens and hydraulic fluid exits the cylinder barrel 210 via the secondary hydraulic fluid passage 220.

Since the primary hydraulic fluid passage 216 closes in a sudden fashion, pressure within the cylinder barrel 210 rises rapidly, which causes the valve 222 to open without much delay after the primary hydraulic fluid passage 216 closes.

Effectively, therefore, there is a sudden switch from the primary hydraulic fluid passage 216 to the secondary hydraulic fluid passage 220. Given the relative difference in diameter of the primary hydraulic fluid passage 216 and the secondary hydraulic fluid passage 220, there is therefore a sudden change in pressure. This gives rise to significant forces being experienced by the steering apparatus as well as by other components of the articulated truck.

Figure 4:
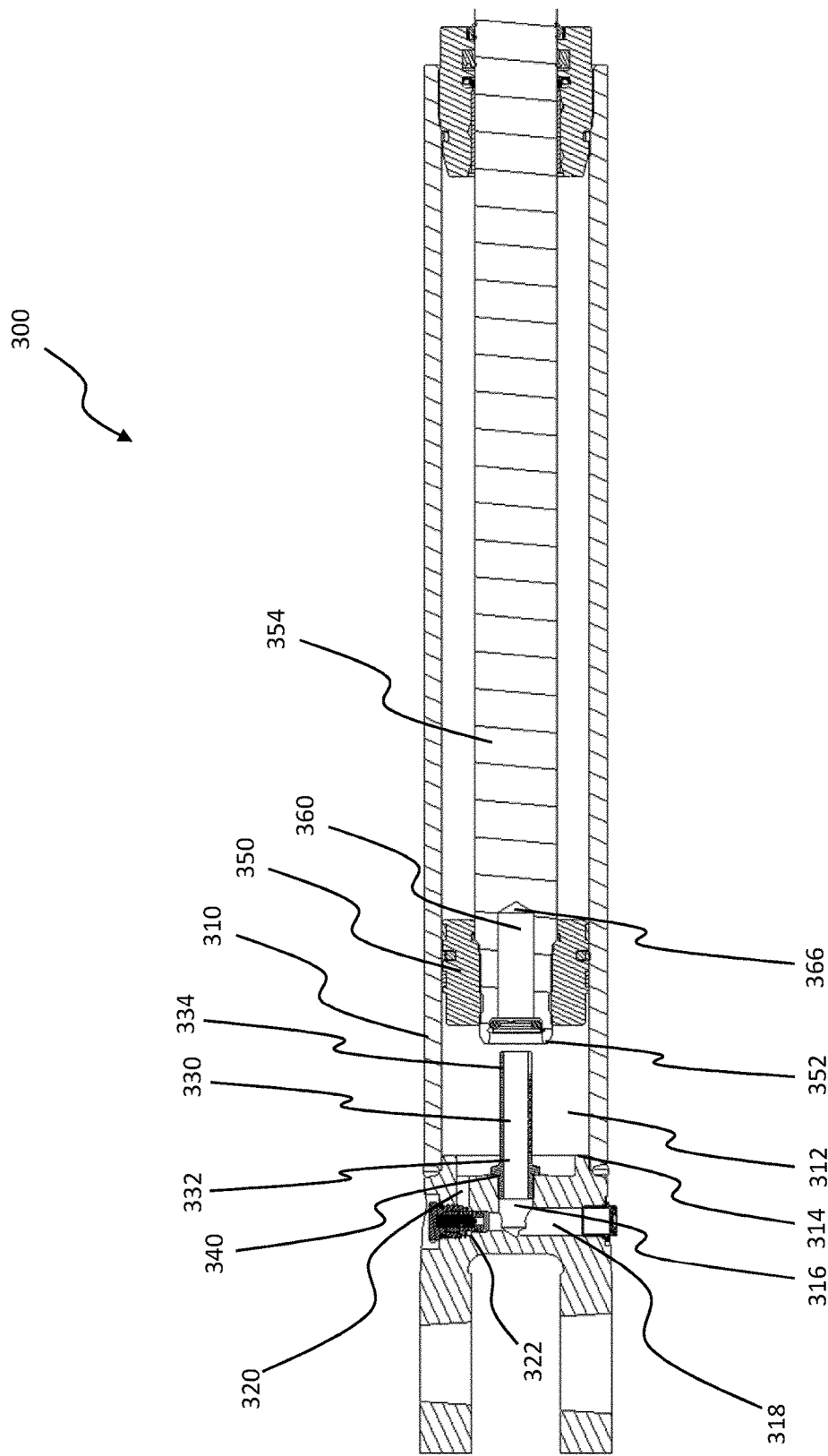
FIG. 4 shows a schematic cross-sectional view of a hydraulic cylinder employed as part of the steering system in accordance with the present disclosure, with a piston of the hydraulic cylinder located at an intermediate position within a cylinder barrel of the hydraulic cylinder.

FIG. 4 shows a schematic cross-sectional view of part of a hydraulic cylinder 300 in accordance with the disclosure. The hydraulic cylinder 300 comprises a cylinder barrel 310 and a piston 350 connected to a piston rod 354.

The cylinder barrel 310 comprises an interior volume 312 a closed end 314. The closed end 314 includes a primary hydraulic fluid passage 316 for routing hydraulic fluid into and out of the interior volume 312 of the cylinder barrel 310. The cylinder barrel 310 further comprises a snubbing tube 330 projecting from the closed end 314 into the interior volume 312. The snubbing tube 330 may have a proximal end 332 closest to the closed end 314 and a distal end 334 extending within the interior volume 312 of the cylinder barrel 310. The snubbing tube 330 may comprise a major orifice 349 (not shown in FIG. 4; see FIG. 5) at the distal end 334 providing access to the interior volume 312. The primary hydraulic fluid passage 316 may open into the interior volume 312 of the cylinder barrel 310 within the snubbing tube 330.

The piston 350 comprises a piston face 352 configured to face the closed end 314 of the cylinder barrel 310. The piston 350 further comprises a snubbing aperture 360 in the piston face 352.

The snubbing aperture 360 is aligned with the snubbing tube 330 of the cylinder barrel 310 such that the snubbing aperture 360 is capable of receiving the snubbing tube 330. The snubbing tube 330 and the snubbing aperture 360 may be coaxial.

The snubbing tube 330 may be substantially cylindrical and the snubbing aperture 360 may also be substantially cylindrical. An inner diameter of the snubbing aperture 360 may be substantially the same as an outer diameter of the snubbing tube 330 such that snubbing aperture 360 just accommodates the snubbing tube 330. The snubbing aperture 360 may be a blind aperture. The snubbing aperture 360 may end with a conical portion 366 of narrowing diameter in which the snubbing tube 330 cannot be accommodated. In this way, a conical volume of the conical portion 366 may be available to accommodate hydraulic fluid even when the snubbing tube 330 is fully inserted into the snubbing aperture 360.

Figure 5:
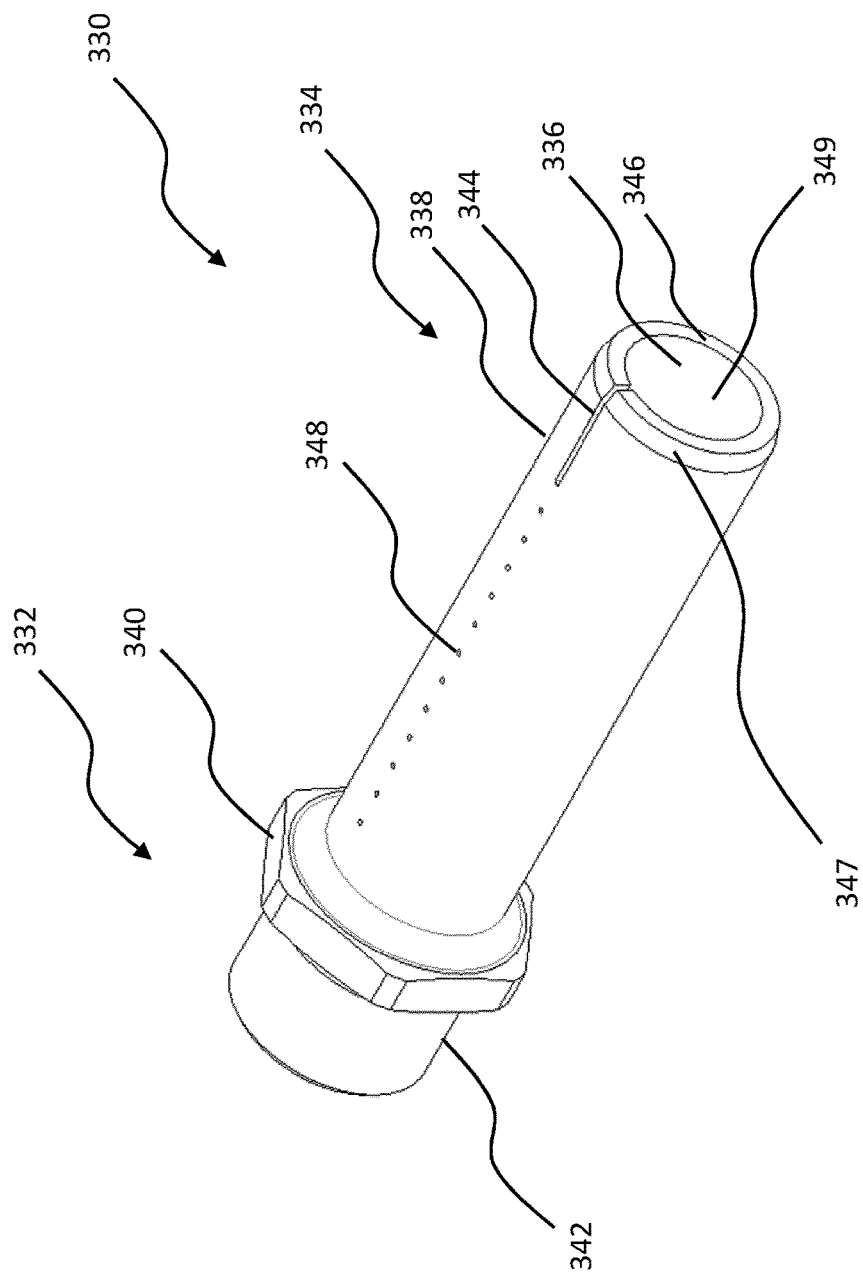
FIG. 5 shows a snubbing tube in accordance with the disclosure.

Referring to FIG. 5, the snubbing tube 330 comprises an interior surface 336 and an exterior surface 338. The interior surface 336 may be substantially cylindrical and the exterior surface 338 may also be substantially cylindrical. The interior surface 336 and the exterior surface 338 may share a common axis, which may be a central axis of the snubbing tube 330. The snubbing tube 330 may further comprise an annular face 346 orthogonal to the central axis at the distal end 334 of the snubbing tube between the interior surface 336 and the exterior surface 338. The annular face 346 may surround the major orifice 349 of the snubbing tube 330. The exterior surface 338 at the distal end 334 of the snubbing tube 330 may comprise a chamfered portion 347.

The exterior surface 338 of the snubbing tube 330 may further comprise a flange 340 orthogonal to the axis of the snubbing tube 330. The flange 340 may have a hex profile to facilitate rotation of the snubbing tube 330 (for installation) using a spanner.

The exterior surface 338 may comprise a threaded portion (not shown) on a section 342 of the exterior surface 338 that lies on one side of the flange 340, towards the proximal end 332 of the snubbing tube 330. The threaded portion 342 may be configured to cooperate with an interior threaded portion within a cylindrical opening at the closed end 314 of the cylinder barrel 310.

At a distal end 334 of the snubbing tube 330, the snubbing tube 330 comprises a slot 344 extending between the interior surface 336 and the exterior surface 338 of the snubbing tube 330 and extending from the annular face 346 a distance part way towards the flange 340. The slot 344 may have a constant width along its length. The slot 344 may be parallel to an axis of the snubbing tube 330.

In an alternative to the slot 344 having a constant width along its length, the slot 344 may have a reducing width in a direction away from the distal end 334 and towards the proximal end 332 of the snubbing tube 330.

The snubbing tube 330 may further comprise a plurality of channels 348 each extending between the interior surface 336 and the exterior surface 338 of the snubbing tube 330. Each of the plurality of channels 348 may be located along a straight line parallel to an axial direction of the snubbing tube 330. A central axis of the slot 344 may also be located along the same straight line.

In this way, access between the exterior surface 338 and the interior surface 336 via the slot 344 and the plurality of channels 348 may be radial relative to the axial direction of the snubbing tube 330 and may be at a single radial angle along the snubbing tube 330. Each channel of the plurality of channels 348 may have a cross sectional area smaller than a cross sectional area of the slot 344. The diameter of each channel of the plurality of channels 348 may be the same as the diameter of each of the other channels of the plurality of channels 348.

The slot 344 and the plurality of channels may facilitate a more gradual change in surface area available for the passage of hydraulic fluid, as the snubbing tube 330 moves relative to (that is into and out of) the snubbing aperture 360. By providing a more gradual change in surface area, a more gradual change (a small rate of change) in pressure may be achieved. This removes step changes in forces which can cause damage to the system. It can also facilitate a smoother operator experience.

Referring back to FIG. 4, the primary hydraulic fluid passage 316 may be fed by a hydraulic fluid conduit 318. The hydraulic fluid conduit 318 may also feed a secondary hydraulic fluid passage 320. The secondary hydraulic fluid passage 320 may further comprise a valve 322 configured to control flow of hydraulic fluid into the secondary hydraulic fluid passage 320.

FIGS. 6 to 9 illustrate the hydraulic cylinder 300 in use, including how hydraulic fluid is configured to flow in response to different conditions. Solid arrows show flow of hydraulic fluid while open arrows show direction of movement of the piston 350 within the cylinder barrel 310.

Figure 6:
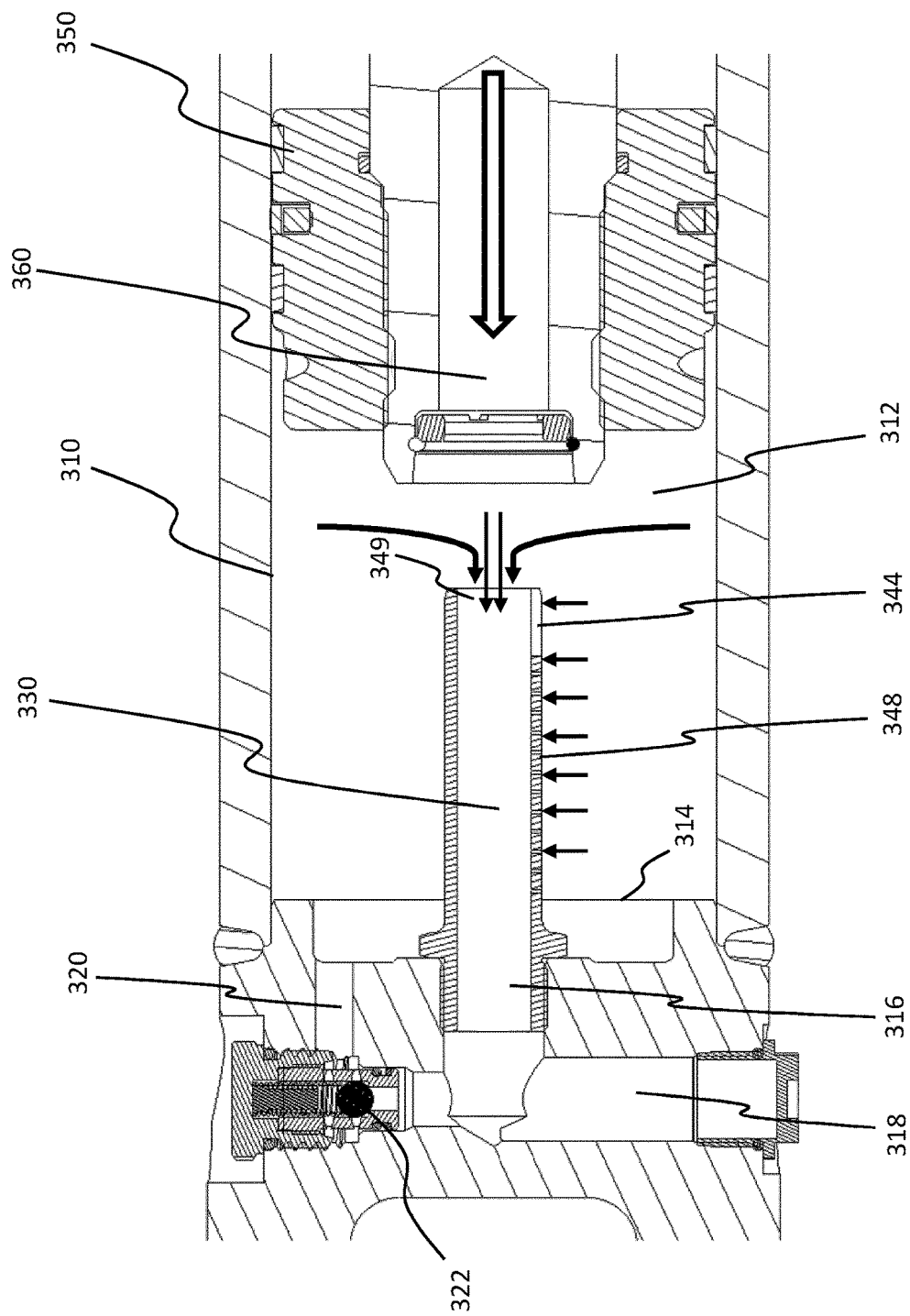
FIG. 6 shows a zoomed in version of the FIG. 4 arrangement focused on one end of the hydraulic cylinder with the piston at the same location within the cylinder barrel as shown in FIG. 3.

FIG. 6 shows a situation where, under pressure of hydraulic fluid, the piston 350 is being forced towards the closed end 314 of the interior volume 312 of the cylinder barrel 310. Hydraulic fluid flows into the major orifice 349 of the snubbing tube 330, then onward into the primary hydraulic fluid passage 316 and on to a hydraulic fluid reservoir (not shown). While most of the hydraulic fluid flows into the major orifice 349 of the snubbing tube 330, some of the hydraulic fluid may flow into the interior of the snubbing tube 330 through the slot 344 and through plurality of channels 348.

Since the valve 322 is closed, no hydraulic fluid flows into the secondary hydraulic fluid passage 320.

Figure 7:
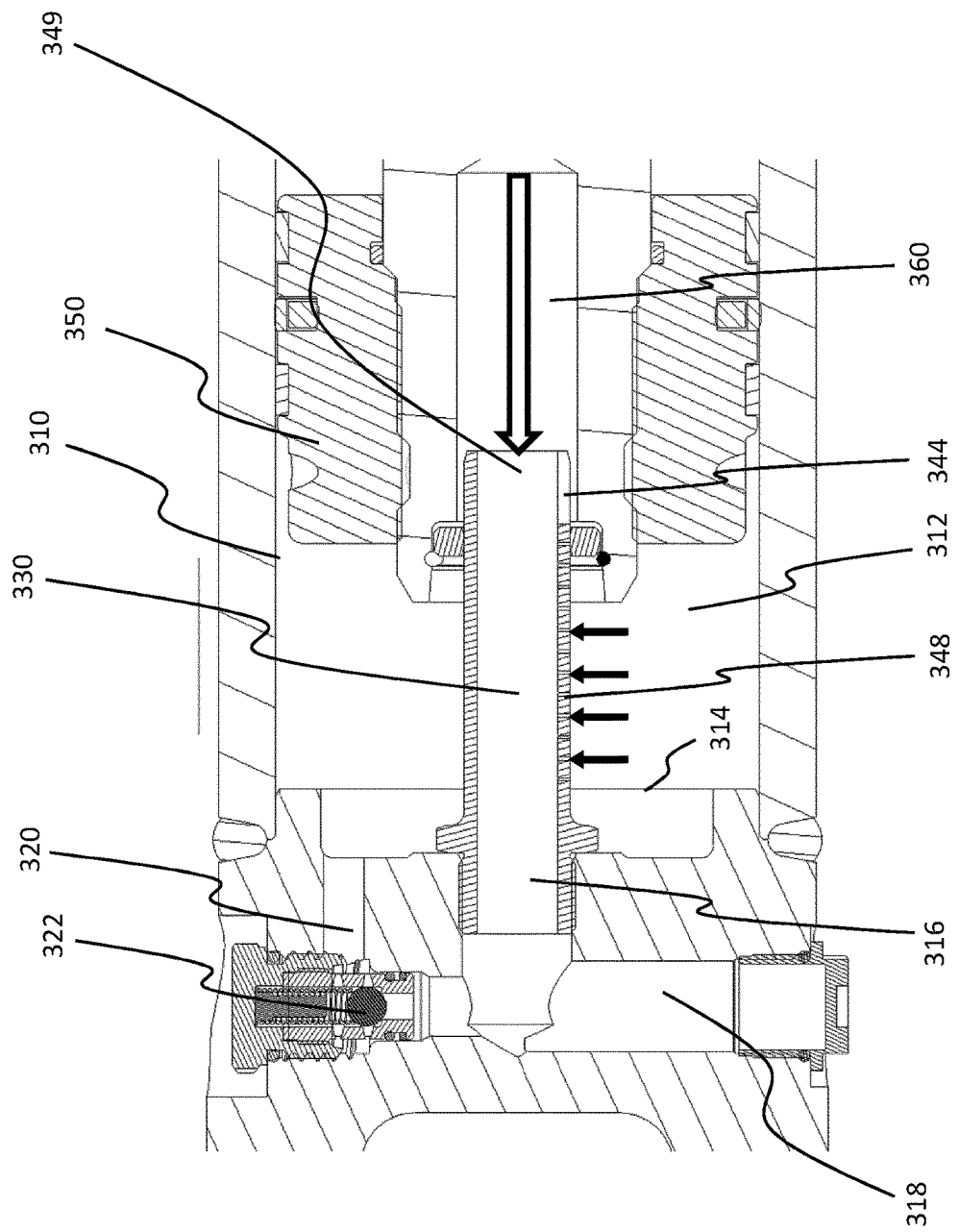
FIG. 7 shows the arrangement of FIG. 6 with the piston moved closer to a closed end of the cylinder barrel.

FIG. 7 shows a situation where the valve 322 remains closed and the piston 350 has moved further towards the closed end 314 of the interior volume 312 of the cylinder barrel 310 such that the major orifice 349 opens into the snubbing aperture 360. As a consequence, a much small proportion of the hydraulic fluid in the interior volume 312 of the cylinder barrel 310 access the interior the snubbing tube 330 by this route and, instead, the major route for hydraulic fluid into the snubbing tube 330 is via the plurality of channels 348 (since, in the position of FIG. 7, the slot 344 is also already within the snubbing aperture 360).

Consequently, the rate of flow of hydraulic fluid out of the cylinder barrel 310 is considerably slower than when the major orifice 349 was available to receive hydraulic fluid. Therefore, the movement of the piston 350 is slower. As the piston 350 moves closer towards the closed end 314 of the cylinder barrel 310, a larger number of the plurality of channels 348 are closed by entry of the snubbing tube 330 into the snubbing aperture 360. This results in a gradual slowing of movement of the piston 350 as it moves closer to the closed end 314 of the cylinder barrel 310 which not only avoids a sudden jolt when the piston 350 reaches the end of its travel but also, given the gradual nature of the damping, avoids a sudden jolt when the damping first comes into effect as the snubbing tube 330 approaches the snubbing aperture 360.

Figure 8:
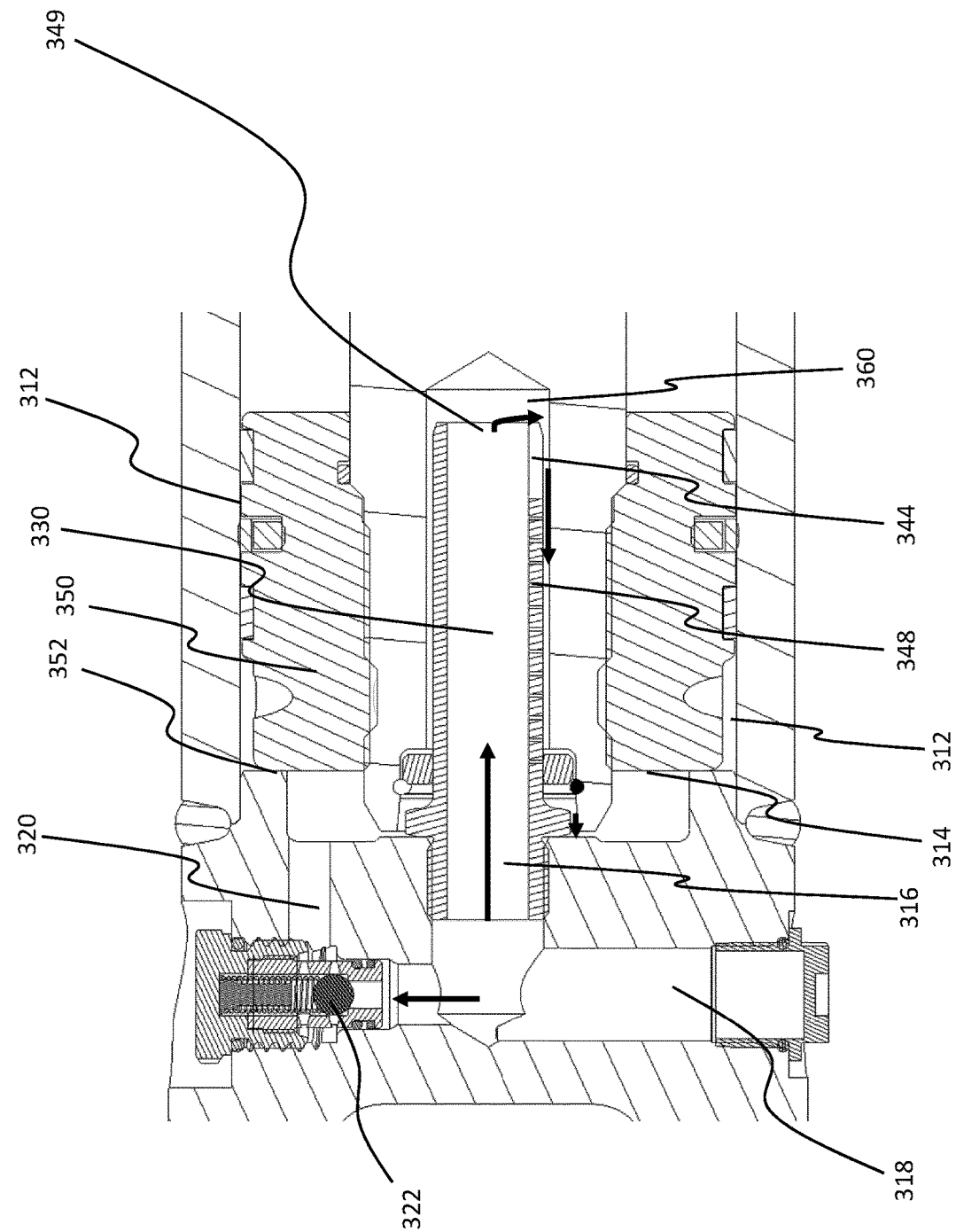
FIG. 8 shows the arrangement of FIGS. 6 and 7 with the piston moved to its position closest to a closed end of the cylinder barrel.

FIG. 8 shows the piston 350 at its furthest position within the cylinder barrel 310. A part of the piston face 352 abuts a part of the closed end 314 such that the piston 350 can move no further toward the closed end 314 of the cylinder barrel 310. This represents so-called "full lock" of the steering system.

In order to move out of full lock, hydraulic fluid moves along the hydraulic fluid conduit 318 and into the primary hydraulic fluid passage 316. However, since there is little opportunity for the fluid to move into the cylinder, and since an area of impact of the hydraulic fluid on the piston 350 is small (mostly limited to a surface of the conical portion 366 at the end of the snubbing aperture 360) movement of the piston 350 is slow and, moreover, hydraulic fluid pressure builds in the hydraulic fluid conduit 318 until such time that valve pressure threshold is exceeded, which results in opening of the valve 322.

Figure 9:
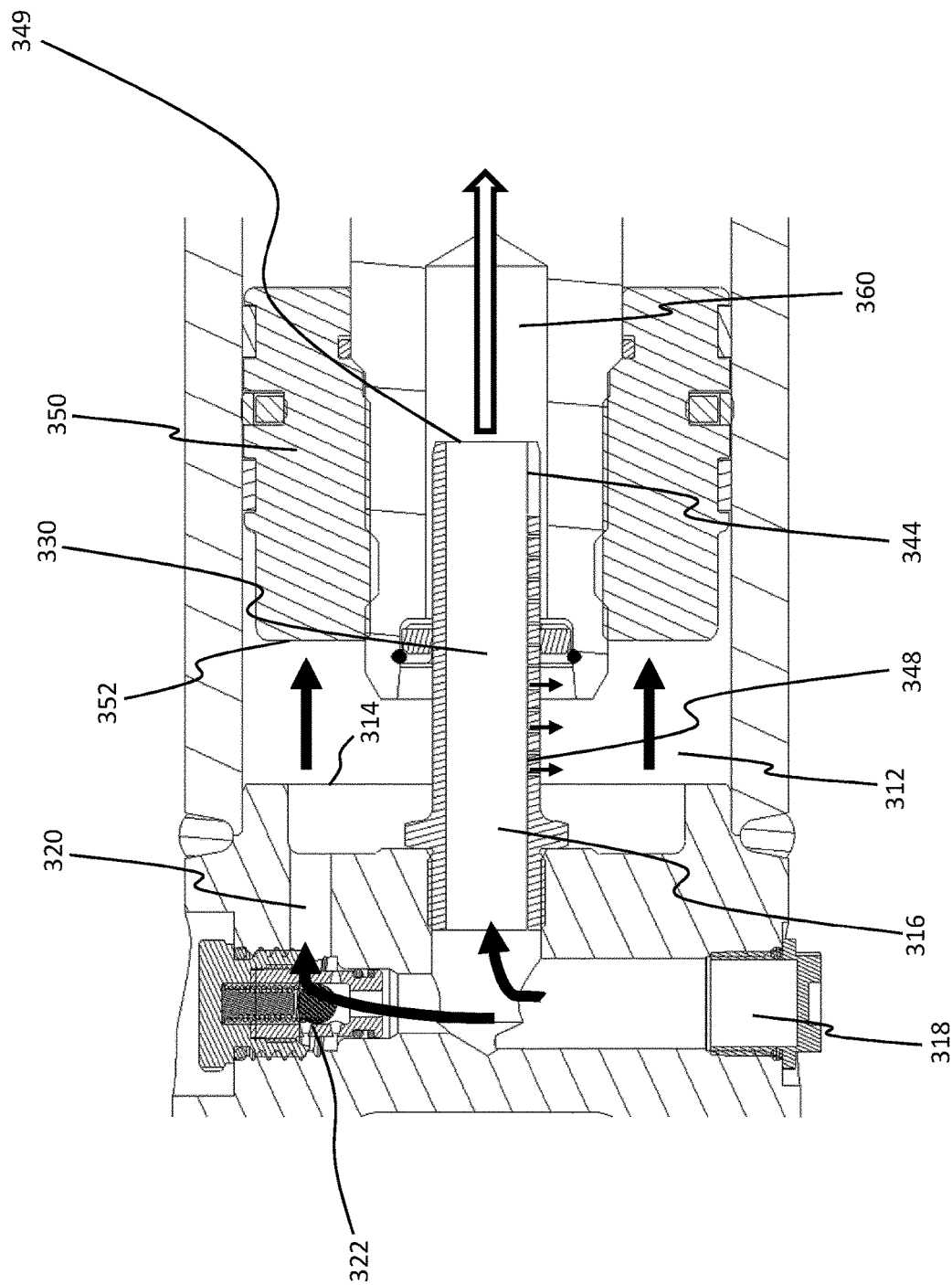
FIG. 9 shows the arrangement of FIGS. 6 to 8 with the piston moving back away from the closed end of the cylinder barrel.

FIG. 9 shows the valve 322 having opened so as to enable flow of hydraulic fluid into the interior volume 312 of the cylinder barrel 310 not only via the primary hydraulic fluid passage 316 but also via the secondary hydraulic fluid passage 320. (Note that in the illustrated embodiment the valve comprises a ball which, when open (see FIG. 9), moves vertically upwards so as to open a portion of the secondary hydraulic fluid passages 320.) Since the secondary hydraulic fluid passage 320 opens directly into the cylinder barrel 310 without going via the snubbing tube 330, and since the secondary hydraulic fluid passage 320 opens into an annular space within the cylinder barrel 310, the area of contact of hydraulic fluid with the piston 350 results in more rapid movement of the piston 350 out of the full lock position than with only the primary hydraulic fluid passage 316 available as the only route for hydraulic fluid into the cylinder barrel 310.

As more hydraulic fluid enters the interior volume 312, the pressure reduces. Furthermore, once the piston 350 has moved sufficiently that the snubbing tube 330 is no longer within the snubbing aperture 360, the pressure reduces further.

Once hydraulic fluid pressure reduces to below the valve pressure threshold, the valve 322 closes such that the secondary hydraulic fluid passage 320 no longer provides a route for hydraulic fluid into the interior volume 312 and all of the hydraulic fluid flowing into the interior volume 312 flows via the primary hydraulic fluid passage 316.

INDUSTRIAL APPLICABILITY

The steering apparatus of the present application may be used to steer an articulated truck 100 comprising a front portion 110 and a rear portion 120 and an articulation joint 130 between the front portion 110 and the rear portion 120. The steering apparatus 140 is configured to steer the articulated truck 100 by effecting a change in angle between the front portion 110 and the rear portion 120. The change in angle between the front portion 110 and the rear portion 120 is achieved using a pair of hydraulic cylinders, one configured to increase a distance between the front portion 110 and the rear portion 120 on a left side of the articulated truck, and another configured to increase a distance between the front portion 110 and the rear portion 120 on a right side of the truck.

Use of the steering apparatus 140 of the present disclosure may result in improved operator experience though smoother operation of the articulated truck, particularly when at or close to full steering lock. Use of the steering apparatus 140 of the present disclosure may result in improved lifetime of the articulated truck 100 on account of components experiencing fewer sudden changes in pressure and force.

The invention claimed is:
1. A steering apparatus for an articulated truck having a front portion, a rear portion, and an articulation joint between the front portion and the rear portion, the steering apparatus comprising:
 a hydraulic cylinder comprising a cylinder barrel and a piston movable within the cylinder barrel to steer the articulated truck by effecting a change in angle between the front portion and the rear portion;
 wherein the cylinder barrel comprises: a closed end including a primary hydraulic fluid passage for routing hydraulic fluid into and out of the cylinder barrel; and a snubbing tube projecting from the closed end into the cylinder barrel, wherein the primary hydraulic fluid passage opens into the cylinder barrel within the snubbing tube;
 wherein the piston comprises: a piston face configured to face the closed end of the cylinder barrel; and a snubbing aperture in the piston face, the snubbing aperture aligned with the snubbing tube and configured to receive the snubbing tube;
 wherein the snubbing tube comprises:
 a slot extending between an exterior of the snubbing tube and an interior of the snubbing tube and located at a distal end of the snubbing tube distant from the closed end of the cylinder barrel; and a plurality of channels extending between the exterior of the snubbing tube and the interior of the snubbing tube and located between the slot and the closed end of the cylinder barrel, each channel having a cross sectional area smaller than a cross sectional area of the slot.

2. The steering apparatus of claim 1 further comprising a secondary hydraulic fluid passage in the closed end of the cylinder barrel for routing hydraulic fluid into and out of the cylinder barrel, wherein the secondary hydraulic fluid passage opens into the cylinder barrel outside the snubbing tube.

3. The steering apparatus of claim 2 wherein the secondary hydraulic fluid passage comprises a valve having a closed position in which the secondary hydraulic fluid passage is closed and an open position in which the secondary hydraulic fluid passage is open.

4. The steering apparatus of claim 3 wherein the valve is a check valve that responds to a threshold pressure wherein in an event that a pressure experienced by the check valve exceeds the threshold pressure the valve adopts the open position and in an event that the pressure experienced by the check valve is less than the threshold pressure the valve adopts the closed position.

5. The steering apparatus of claim 4 wherein the threshold pressure is between X and Y bar.

6. The steering apparatus of claim 1 wherein the cylinder barrel comprises an annular abutment against which the piston face comes to rest at a full lock position of the steering apparatus.

7. The steering apparatus of claim 6 wherein the cylinder barrel comprises an annular cavity coaxial with the annular abutment, wherein the piston face stops short of the annular abutment at the full lock position of the steering apparatus.

8. The steering apparatus of claim 7, wherein the secondary hydraulic fluid passage opens into the cylinder barrel within the annular cavity.

9. The steering apparatus of claim 1 wherein alignment of the snubbing aperture with the snubbing tube is such that the snubbing tube is received within the snubbing aperture so as to provide a fluid tight seal between an exterior of the snubbing tube and an interior of the snubbing aperture.

10. An articulated truck comprising a front portion, a rear portion, and an articulation joint between the front portion and the rear portion, and further comprising the steering apparatus of claim 1 configured to effect a change in angle between the front portion and the rear portion.

11. The articulated truck of claim 10 wherein the steering apparatus is one of a pair of cooperating steering apparatuses, wherein one of the pair of steering apparatuses is on a left side of the machine to effect extension and contraction between the front portion and the rear portion on the left side of the machine and another of the pair of steering apparatuses is on a right side of the machine to effect extension and contraction between the front portion and the rear portion on the right side of the machine.

\* \* \* \* \*